C. G. SCHNEPEL.
SHEET METAL RECEPTACLE.
APPLICATION FILED FEB. 24, 1920.

1,361,350. Patented Dec. 7, 1920.

INVENTOR
C.G. SCHNEPEL,
BY
Milton S. Crandall
ATTORNEY

UNITED STATES PATENT OFFICE.

CARL G. SCHNEPEL, OF SIOUX CITY, IOWA.

SHEET-METAL RECEPTACLE.

1,361,350.  Specification of Letters Patent.  Patented Dec. 7, 1920.

Application filed February 24, 1920. Serial No. 360,861.

*To all whom it may concern:*

Be it known that I, CARL G. SCHNEPEL, a citizen of the United States, and a resident of Sioux City, in the county of Woodbury and State of Iowa, have invented certain new and useful Improvements in Sheet-Metal Receptacles, of which the following is a specification.

My invention aims to provide an improved seamless sheet-metal receptacle.

Another object of the invention is the production of a sheet-metal receptacle particularly adapted as a stock watering tank.

With these and other objects in view, the invention consisting in the construction, combination and novel arrangement of parts, will be fully understood from the following description, reference being had to the accompanying drawings, which form a part of this application and in which like characters of reference indicate corresponding parts throughout the several views, of which,—

Figure 1:
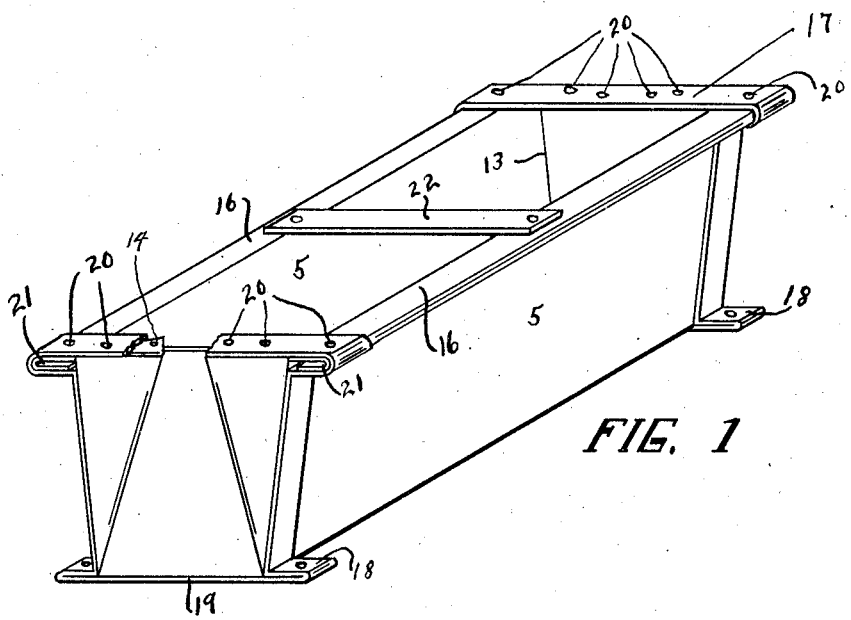
Figure 1 is a perspective view of a tank constructed in accordance with the invention, a part being cut away.
Figure 2:
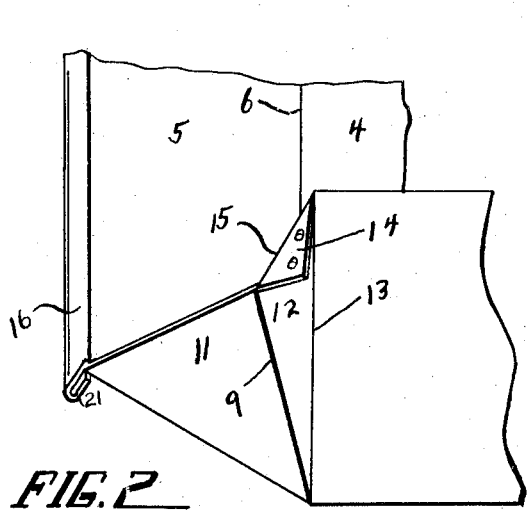
Fig. 2 is an enlarged corner portion thereof, partially folded.
Figure 3:
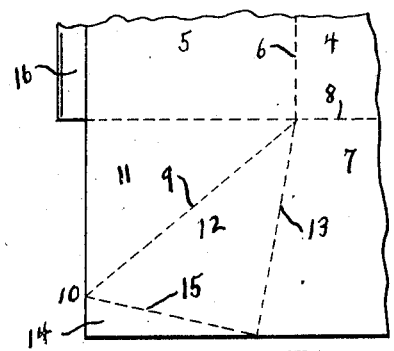
Fig. 3 is a plan of one corner portion as before folding.

Referring now to the illustrations, the receptacle is formed of a single integral metal sheet, the central portion of which forms the bottom, 4, of the receptacle, and the side portions, 5, of which are folded as at 6, to form the side walls, which preferably are flared outwardly to prevent distortion of the receptacle by water freezing therein. The end portions, 7, of the sheet are then folded on the line, 8, to extend upwardly. The corner portions of the sheet are folded inwardly along the diagonal line, 9, extending from the intersection of the lines, 6 and 8, to a point, 10, on the adjacent side edge, a distance from the edge of the end part, 7, thus forming corner parts, 11 and 12, which are folded over against each other as will be clearly understood from Figs. 1 and 2, by raising the adjacent side wall, 5, and incidentally folding the part, 12, on the line, 13, which extends from the junction of lines, 6, 8 and 9, to the edge of the part, 7, and at an angle outwardly to the line, 6; then as the adjacent side wall and end wall are brought to position the wall fold, 13, rests adjacent the side wall and the parts, 11, 12 and 7, are pressed together.

This specific folding, it will be observed, leaves a corner flap, 14, projecting above the end wall, which is folded on the line, 15, to a horizontal position over the end wall. The structure may be reëmbraced in any suitable fashion. In the present embodiment, the side walls are provided with wings, 16, which are folded over as at, 21, to lend the device rigidity.

The ends of the receptacle are clad with iron strips, 17, extending transversely across the tank and above the end walls thereof, then bent around the folded wall portions, 16, then downwardly adjacent the side walls, then outwardly a distance and back upon themselves, as at, 18, thence extended below the tank as at, 19, the parts, 18 and 19, serving as a support for the tank. The upper portions of the iron frames thus formed are riveted or otherwise suitably secured, as at, 20, to the side wall portions, 16, and the ears or flaps, 14. 22 is an intermediate cross brace, suitably secured to the side wall portions, 16.

This construction is seamless, simple and inexpensive in manufacture, and its walls are not perforated by rivets or other fastening members, which might cause leakage.

Having thus described my invention, what I claim as new and desire to secure by Letters Patent of the United States is,—

1. A sheet-metal receptacle comprising an integral rectangular sheet having its side portions folded upwardly and outwardly on longitudinal lines to form flaring side walls, the end portions being folded upwardly at right angles on transverse lines intersecting said first lines to form end walls, the corner portions being folded diagonally upon themselves and against the end walls whereby parts of said corner portions extend above the receptacle, said parts being bent inwardly above the end walls, and strips extending across the tops of the end portions of the receptacle and downwardly against the side walls, and fixed to said inwardly-extended parts.

2. A sheet-metal receptacle comprising an integral rectangular sheet having its side portions folded upwardly and outwardly on longitudinal lines to form flaring side walls, the end portions being folded upwardly at right angles on transverse lines intersecting said first lines to form end walls, the corner portions being folded diagonally upon themselves and against the end walls, whereby parts of said corner portions extend above the receptacle, said parts being bent inwardly above the end walls, and the upper edge portions of the side walls being bent outwardly to form flanges, and strips extended across the top of the receptacle and secured to said parts and flanges.

In testimony whereof I have hereunto set my hand this 10th day of Oct., 1919.

CARL G. SCHNEPEL.